United States Patent
Shelke et al.

(10) Patent No.: US 11,853,154 B2
(45) Date of Patent: Dec. 26, 2023

(54) AUTOMATED GLOBAL CONFIGURATION ERROR REMOVAL OF CLUSTERED NETWORK DEVICES

(71) Applicant: HEWLETT PACKARD ENTERPRISE DEVELOPMENT LP, Houston, TX (US)

(72) Inventors: Rajendra Ram Shelke, Roseville, CA (US); Shaun Wackerly, Lincoln, KY (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/726,208

(22) Filed: Apr. 21, 2022

(65) Prior Publication Data

US 2023/0342238 A1    Oct. 26, 2023

(51) Int. Cl.
  *G06F 11/07* (2006.01)
  *H04L 41/0866* (2022.01)
  *G06F 11/30* (2006.01)

(52) U.S. Cl.
  CPC ...... *G06F 11/0793* (2013.01); *G06F 11/0709* (2013.01); *G06F 11/302* (2013.01); *H04L 41/0866* (2013.01)

(58) Field of Classification Search
  CPC .............. G06F 11/0793; G06F 11/302; G06F 11/3051; H04L 41/0866; H04L 41/0869
  See application file for complete search history.

(56) References Cited

U.S. PATENT DOCUMENTS

| | | | |
|---|---|---|---|
| 2003/0149756 A1* | 8/2003 | Grieve | H04L 41/0866 709/223 |
| 2006/0104220 A1* | 5/2006 | Yamazaki | H04L 41/0853 370/254 |
| 2012/0185925 A1* | 7/2012 | Barkie | H04L 41/5051 726/7 |
| 2018/0270109 A1* | 9/2018 | Hollis | H04L 41/0803 |
| 2019/0296982 A1* | 9/2019 | Clark | H04W 24/02 |
| 2020/0175103 A1 | 6/2020 | Atwal et al. | |
| 2020/0374196 A1* | 11/2020 | Powell | H04L 41/0843 |

OTHER PUBLICATIONS

Chen et al., "Towards automated network management: network operations using dynamic views", .Proceedings of the 2007 SIGCOMM workshop on Internet network management, 2007, 6 pages.

David Lutterkort, "Augeas—a configuration API", Linux Symposium, 2018, 12 pages.

He et al., "A regular expression grouping algorithm based on partitioning method", 3rd IEEE International Conference on Network Infrastructure and Digital Content, 2012.

(Continued)

*Primary Examiner* — Yolanda L Wilson
(74) *Attorney, Agent, or Firm* — Sheppard Mullin Richter & Hampton LLP

(57) ABSTRACT

Embodiments assist with dynamic repairs to the system's grammar. The system can determine the existence of errors within common configuration files. The system can use this determination to compare a common configuration file with a term replacement dictionary to determine resolution options. The system can update the term replacement dictionary if the error or resolution for the error is not in the term replacement dictionary.

20 Claims, 6 Drawing Sheets

(56) References Cited

OTHER PUBLICATIONS

Hewlett Packard Enterprise Development LP, "Aruba Netedit Hardening Guide: Aruba CX Switching," Oct. 30, 2020, <https://www.arubanetworks.com/techdocs/AOS-CX/NetEdit/Aruba_NetEdit_Hardening_Guide.pdf>. 11 pages.

Hewlett Packard Enterprise Development LP, "NetEdit User Guide: 2.3.0," edition 1, Feb. 2022, <https://www.arubanetworks.com/techdocs/AOS-CX/NetEdit/ne_2-3-0_ug.pdf, 60 pages.

Kim et al., "The evolution of network configuration: A tale of two campuses", Proceedings of the 2011 ACM SIGCOMM conference on Internet measurement conference, 2011, 16 pages.

Santolucito et al., Synthesizing Configuration File Specification with association rule learning, ACM, Oct. 2017, 20 pages.

Reijers, Hajo A., et al. "Syntax highlighting in business process models." Decision Support Systems 51.3:, 2011, p. No. 339-349.

\* cited by examiner

AUTOMATED GLOBAL CONFIGURATION ERROR REMOVAL OF CLUSTERED NETWORK DEVICES

BACKGROUND

A programming language is defined by its grammar, which may restrict the commands, parameters, and syntax that may be used in the language. The configuration files used to configure network switches generally conform to a similar grammar, but one that is specific to the configuration of such switches.

BRIEF SUMMARY OF THE DISCLOSURE

In accordance with one embodiment, a method for resolving configuration errors through a server comprises aggregating a plurality of configuration files to generate a first common configuration file; determining one or more line specification errors or line ordering errors in the first common configuration file, wherein the line specifications errors are one or more errors associated with one or more line specifications; comparing the first common configuration file with a term replacement database; updating the term replacement database with the determined one or more line specification errors or line ordering errors; updating a second common configuration file corresponding to a plurality of switches; and validating the plurality of switches with the second common configuration file.

In other embodiments, the plurality of configuration files is a first plurality of configuration files, and the method further comprises identifying one or more additional line specification errors or line ordering errors within a second plurality of configuration files, wherein at least one of the one or more additional line specification errors or line ordering errors is a line specification or line ordering error within the first plurality of configuration files; and reclassifying the at least one of the one or more additional line specification errors or line ordering errors within the second plurality of configuration files.

In other embodiments, the method further comprises updating a user interface to display the at least one of the one or more additional line specification errors or line ordering errors within the second plurality of configuration files.

In other embodiments, the method further comprises updating a user interface to display the one or more line specification errors or line ordering errors based on the type of error.

In other embodiments, generating the common configuration file comprises replacing one or more pluralities of line specifications with one or more standardized line specifications, wherein each standardized line specification represents a plurality of line specifications.

In other embodiments, at least one of the errors comprises a line ordering error, and further comprising performing a standardized reordering of the line specifications to resolve the at least one line ordering error.

In other embodiments, the method further comprises prompting a user to correct the one or more line specification errors or line ordering errors.

In other embodiments, the method further comprises receiving a user input to correct the one or more line specification errors or line ordering errors and updating the term replacement database with the user input.

In other embodiments, the method further comprises determining that the user input does not resolve the error with the order of line specifications and removing the user input from the term replacement database.

In other embodiments, the method further comprises sending a notification that the term replacement database has been updated.

In accordance with another embodiment, a system comprises a hardware processor and a non-transitory machine-readable storage medium encoded with instructions executable by the hardware processor to perform a method comprising aggregating a plurality of configuration files to generate a first common configuration file; determining one or more line specification errors or line ordering errors in the first common configuration file, wherein the line specifications errors are one or more errors associated with one or more line specifications; comparing the first common configuration file with a term replacement database; updating the term replacement database with the determined one or more line specification errors or line ordering errors; updating a second common configuration file corresponding to a plurality of switches; and validating the plurality of switches with the second common configuration file.

In other embodiments, the system further comprises a plurality of firmware, wherein at least one configuration file from the plurality of configuration files corresponds to each firmware.

In other embodiments, the term replacement database is stored in a cloud network.

In other embodiments, the cloud network further comprises a central configuration center.

In accordance with another embodiment, a non-transitory computer-readable storage medium stores a plurality of instructions executable by one or more processors, wherein the plurality of instructions when executed by the one or more processors cause the processor to aggregate a plurality of configuration files to generate a first common configuration file; determine one or more line specification errors or line ordering errors in the first common configuration file, wherein the line specifications errors are one or more errors associated with one or more line specifications; compare the first common configuration file with a term replacement database; update the term replacement database with the determined one or more line specification errors or line ordering errors; update a second common configuration file corresponding to a plurality of switches; and validate the plurality of switches with the second common configuration file.

In other embodiments, the plurality of configuration files is a first plurality of configuration files, and wherein the plurality of instructions further causes the processor to identify one or more additional line specification errors or line ordering errors within a second plurality of configuration files, wherein at least one of the one or more additional line specification errors or line ordering errors is a line specification or line ordering error within the first plurality of configuration files and reclassify the at least one of the one or more additional line specification errors or line ordering errors within the second plurality of configuration files.

In other embodiments, generating the common configuration file comprises replacing one or more pluralities of line specifications with one or more standardized line specifications, wherein each standardized line specification represents a plurality of line specifications.

In other embodiments, at least one of the errors comprises a line ordering error, and the plurality of instructions when executed by the one or more processors further causes the processor to perform a standardized reordering of the line specifications to resolve the at least one line ordering error.

In other embodiments, the plurality of instructions when executed by the one or more processors further causes the processor to receive a user input to correct the one or more line specification errors or line ordering errors and updating the term replacement database with the user input.

In other embodiments, the plurality of instructions when executed by the one or more processors further causes the processor to determine that the user input does not resolve the error with the order of line specifications and removing the user input from the term replacement database.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
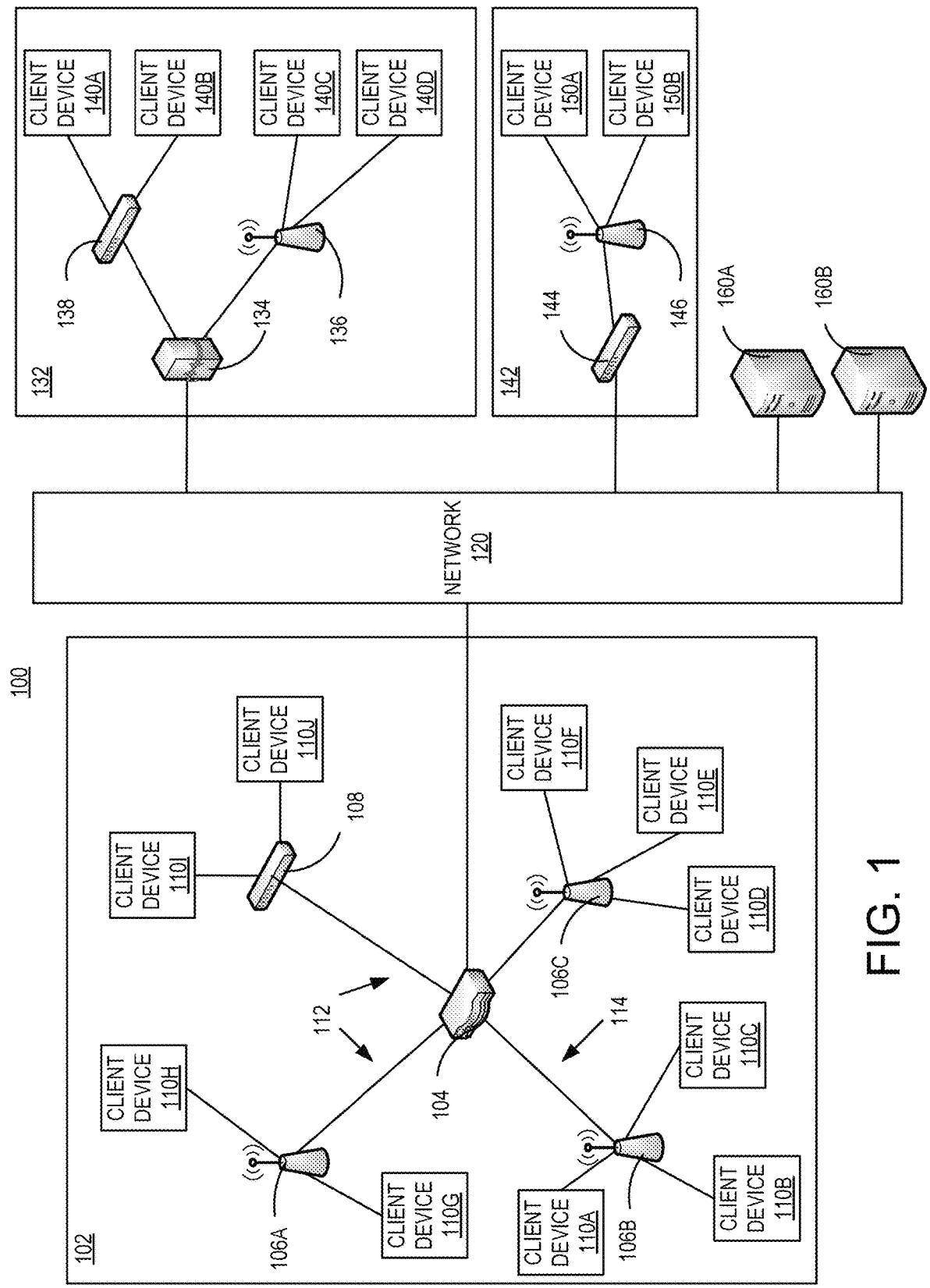
FIG. 1 illustrates one example of a network topology that may be implemented for an organization, such as a business, educational institution, governmental entity, healthcare facility or other organization.

The figures are not exhaustive and do not limit the present disclosure to the precise form disclosed.

DETAILED DESCRIPTION

Embodiments assist with dynamic repairs to the system's grammar while editing configuration files of multiple network switches as a single file or "common configuration file." The system can determine the existence of configuration errors, i.e. errors in either individual line specifications or in ordering of the line specifications. The system can use this determination to compare the common configuration file with a term replacement dictionary, which is a database that stores information on resolving various configuration errors and can provide repairs or solutions to effectuate a repair. The system can update the term replacement dictionary if the error or resolution for the error is not in the term replacement dictionary. Repairs may be accomplished automatically or through user prompt. But while various embodiments are described in terms of editing common configuration files for network switches, it should be noted that the technology described herein may be employed to edit common configuration files for any configurable devices.

Returning to the example of network switches, the switches may be of the same or different models, and thus may employ the same or different configuration grammars. The base grammar of each switch may be obtained, either directly from the switch or from other sources. The base grammar of a switch is the definition of which commands are valid in which context on the switch, along with the syntax for each command. A patch grammar may be identified for each of the network switches. Each patch grammar may include (i) grammar known to be supported by the switch, but not included in the base grammar of the switch, and (ii) grammar that allows these grammars to be combined with the grammars of other switches. The base grammars and patch grammars of multiple switches may be combined to form a single grammar, referred to herein as an "augmented grammar." This augmented grammar allows the configuration files of the switches to be displayed, validated, and edited as a single common configuration file. After validation, a respective configuration file may be modified or generated for each switch, and installed at the respective switches. In various implementations, multiple configuration files may be edited as a single common configuration file.

To form the common configuration file, similar line specifications throughout a plurality of configuration files are consolidated such that each line specification in the common configuration file is representative of the line specification in multiple configuration files. For example, if the first line specification in each configuration involves a particular command, then the first line specification in the common configuration file would involve the same command. If the accompanying inputs or pre-requisites for the command differ across the configuration files, then the common configuration file will display all different types of input at that line specification. For example, if two configuration files have matching inputs, and two other configuration files have matching inputs that differ from the first two, then the common configuration file will reflect one consolidated line specification based on the first pair and a second consolidated line specification based on the second pair. The common configuration file may also consolidate all different inputs into one line specification with a representation of all inputs in the one line specification. For example, if the first line specification in a plurality of configuration files includes "vlan 1," "vlan 2," vlan 3," then the first line specification in the common configuration file may be "vlan 1-3." The format can vary for this common configuration file to accommodate all differences between the configuration files. It should be noted that the common configuration can involve other non-file objects, such as databases. As an example, a plurality of databases can be edited through the use of a single common configuration database by aggregating parameters across a plurality of databases to reflect one aggregate parameter.

This grammar serves as sets of instructions for validation and activation of the switches. By forming the common configuration file, instructions across multiple switches can be updated simultaneously and dynamically, such that the updates are consistent across all switches due to only being implemented once. In various implementations, updates to the common configuration file can further effectuate simultaneous updates to a plurality of switches by providing automatic edits to shorten the validation process. These automatic updates also provide dynamic edits that can also assist in the validation of future switches that have not been configured yet.

Validation may be performed almost entirely "off box," that is, on a platform separate from the switch. Final validation of the resulting common configuration file is performed "on box" but as a single operation for a common configuration file that has already passed through "off box" validation. Thus, operation of each switch may be unaffected until the validated common configuration file is installed in the switch.

Embodiments of the application describe various technical improvements, including expediting the validation process across a plurality of network switches simultaneously. Previously, errors associated with validation checks could significantly delay the validation process, particularly in cases of configuring new parameters or features for a particular switch, where the system lacks knowledge about the new parameters or features, referred to herein as "false negatives." Embodiments of the application can determine whether a potential "error" reflects a false negative, at which point the system will never determine an error. Furthermore, embodiments of the application provide automatic resolutions that were previously unavailable, such as standardized reordering and prompts to locally resolve errors, wherein the system provides a user detailed information on the determined errors, including potential resolutions. Therefore, embodiments of the application describe various technical improvements to the validation process for network switches.

Before describing embodiments of the disclosed systems and methods in detail, it is useful to describe an example network installation with which these systems and methods might be implemented in various applications. FIG. 1 illustrates one example of a network topology 100 that may be implemented for an organization, such as a business, educational institution, governmental entity, healthcare facility or other organization. This diagram illustrates an example of a configuration implemented with an organization having multiple users (or at least multiple client devices 110A-J) and possibly multiple physical or geographical sites 102, 132, 142. The network topology 100 may include a primary site 102 in communication with a network 120. The network topology 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106A-C. Switches 108 and wireless APs 106A-C provide network connectivity to various client devices 110A-J. Using a connection to a switch 108 or AP 10A-C, a client device 110A-J may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110I-J. Client devices 110I-J may connect to the switch 108 and through the switch 108, may be able to access other devices within the network topology 100. The client devices 110I-J may also be able to access the network 120, through the switch 108. The client devices 110I-J may communicate with the switch 108 over a wired 112 connection. In the illustrated example, the switch 108 communicates with the controller 104 over a wired 112 connection, though this connection may also be wireless.

Wireless APs 106A-C are included as another example of a point of access to the network established in primary site 102 for client devices 110A-H. Each of APs 106A-C may be a combination of hardware, software, and/or firmware that is configured to provide wireless network connectivity to wireless client devices 110A-H. In the illustrated example, APs 106A-C can be managed and configured by the controller 104. APs 106A-C communicate with the controller 104 and the network over connections 112, which may be either wired or wireless interfaces.

The network topology 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140A-D.

In various embodiments, the remote site 132 may be in direct communication with primary site 102, such that client devices 140a-d at the remote site 132 access the network resources at the primary site 102 as if these clients devices 140A-D were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network topology 100 may include one or more smaller remote sites 142, comprising only a gateway device 144 for communicating with the network 120 and a wireless AP 146, by which various client devices 150A-B access the network 120. Such a remote site 142 may represent, for example, an individual employee's home or a temporary remote office. The remote site 142 may also be in communication with the primary site 102, such that the client devices 150A-B at remote site 142 access network resources at the primary site 102 as if these client devices 150A-B were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160A-B. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network topology 100 but that facilitate communication between the various parts of the network topology 100, and between the network topology 100 and other network-connected entities. The network 120 may include various content servers 160A-B. Content servers 160A-B may include various providers of multimedia downloadable and/or streaming content, including audio, video, graphical, and/or text content, or any combination thereof. Examples of content servers 160A-B include, for example, web servers, streaming radio and video providers, and cable and satellite television providers. The client devices 110A-J, 140A-D, 150A-B may request and access the multimedia content provided by the content servers 160A-B.

Figure 2:
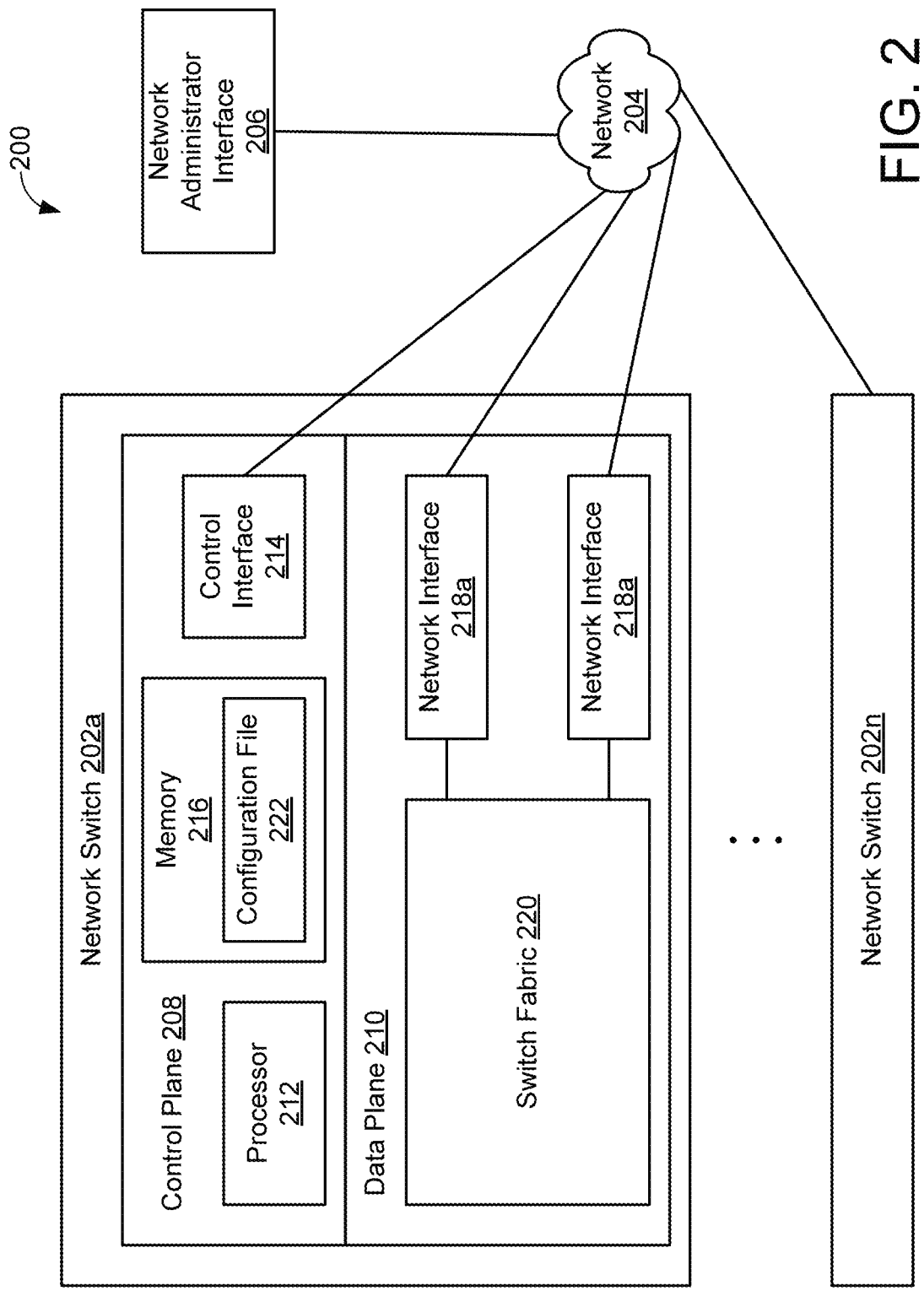
FIG. 2 is a block diagram of an example system in which embodiments described herein may be implemented.

FIG. 2 is a block diagram of an example system 200 in which embodiments described herein may be implemented. Referring to FIG. 2, the example system 200 includes a plurality of network switches 202a-n connected to a network 204, and a network administrator interface 206, also connected to the network 204. The network switch 202 may include a control plane 208 and a data plane 210. The control plane 208 may include a processor 212, a control interface 214, and a memory 216. The memory 216 may store a common configuration file 222, according to which the network switch 202 operates. The control interface 214 may be connected to the network 204. The data plane 210 includes a switch fabric 220 and a plurality of network interfaces 218a-n. The network interfaces 218a-n may be connected to the network 204.

The network administrator interface 206 may be used by a network administrator to configure the network switch 202 through the control interface 214 of the network switch 202. For example, a network administrator may use the network administrator interface 206 to obtain, edit, and replace or modify the common configuration file 222 stored in the memory 216 of the network switch 202, as described in detail below.

Figure 3:
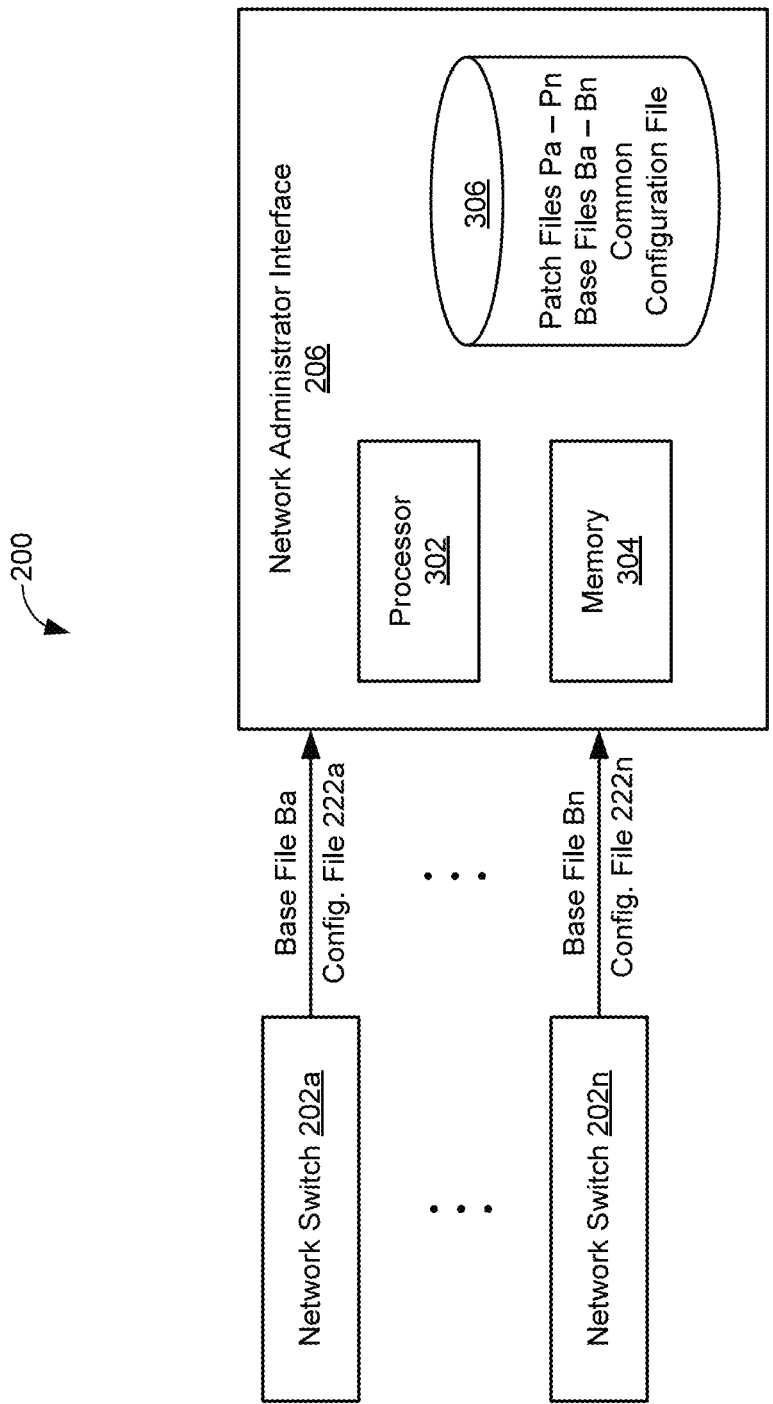
FIG. 3 illustrates an example use of files in the system of FIG. 2.

The described embodiments employ several different files. FIG. 3 illustrates an example use of these files in the system 200 of FIG. 2. For clarity, these files are described here with reference to FIG. 3. Referring to FIG. 3, additional detail is shown for the network administrator interface 206. In particular, the network administrator interface 206 includes a processor 302, a memory 304, and a database 306. The database 306 may store a base file for each network switch 202. That is, the database 306 may store base files Ba-n for network switches 202a-n, respectively. Each base file B represents the configuration grammar present in the respective network switch 202. The base files Ba-n may be obtained directly from the network switch 202a-n, from other sources, or from any combination thereof.

The database 306 may store a respective patch file Pa-n for each of the network switches 202a-n. Each patch file P represents an augmentation grammar that is not provided by the respective network switch 202, but is employed by various embodiments to augment the respective base grammar B such that the configuration files 222 of the network switches 202 can be displayed, validated, and edited as a common configuration file, also shown in FIG. 3.

Figure 4A:
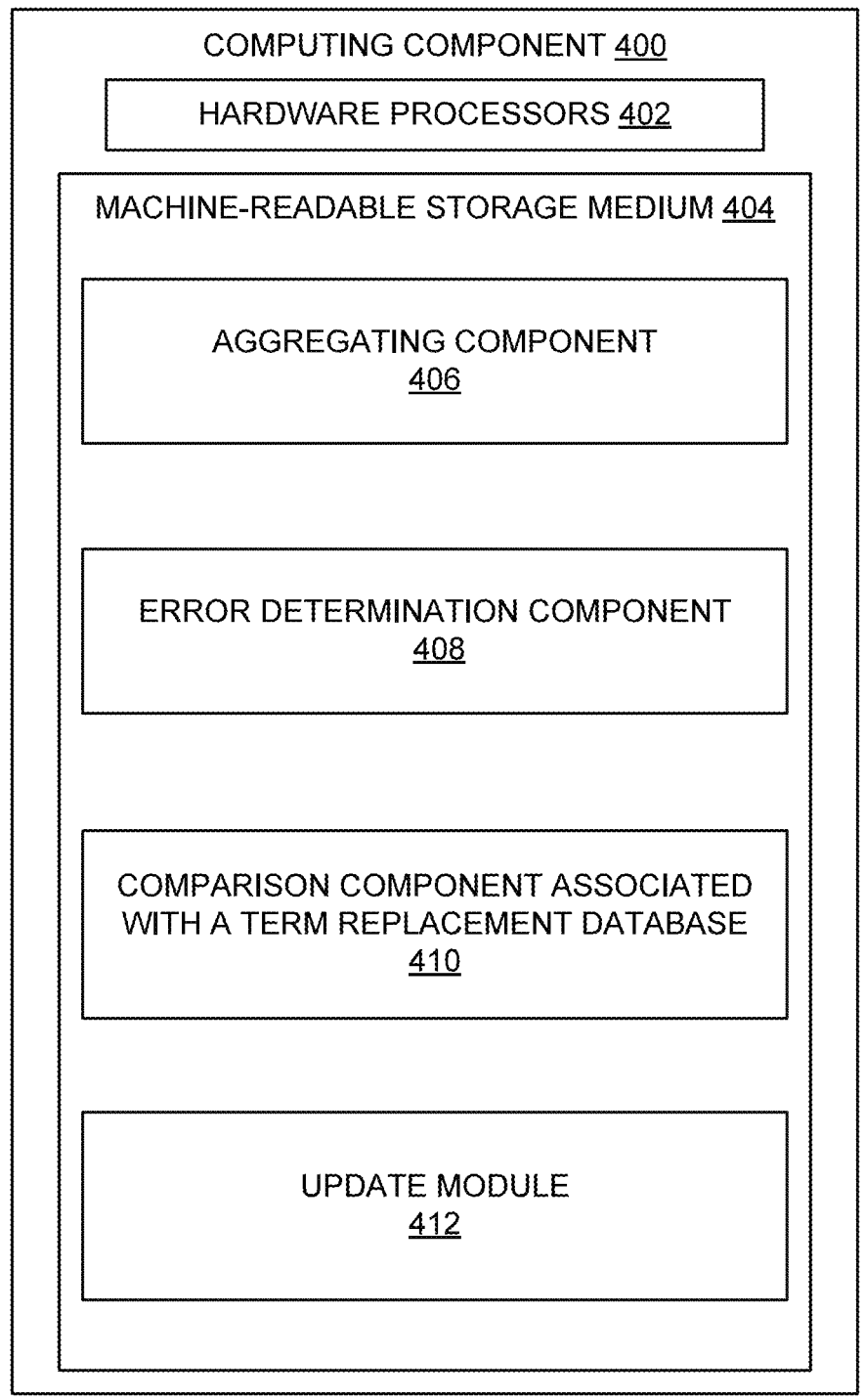
FIG. 4A illustrates an example system in accordance with one embodiment.

FIG. 4A is a block diagram of an example computing component or device 400 for repairing common configuration files in accordance with one embodiment. Computing component 400 may be, for example, a server computer, a controller, or any other similar computing component capable of processing data. In the example implementation of FIG. 4A, the computing component 400 includes a hardware processor 402 and a machine-readable storage medium 404. In some embodiments, computing component 400 may be an embodiment of the processor 302 of the network administrator interface 206, the processor 212 of the network switch 202, or any combination thereof.

Hardware processor 402 may be one or more central processing units (CPUs), semiconductor-based microprocessors, and/or other hardware devices suitable for retrieval and execution of instructions stored in machine-readable storage medium 404. Hardware processor 402 may fetch, decode, and execute instructions for components 406, 408, 410, and 412, to control processes or operations for dynamic grammar augmentation for editing multiple network switch configuration files as a common configuration file. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for components 406, 408, 410, and 412.

Figure 4B:
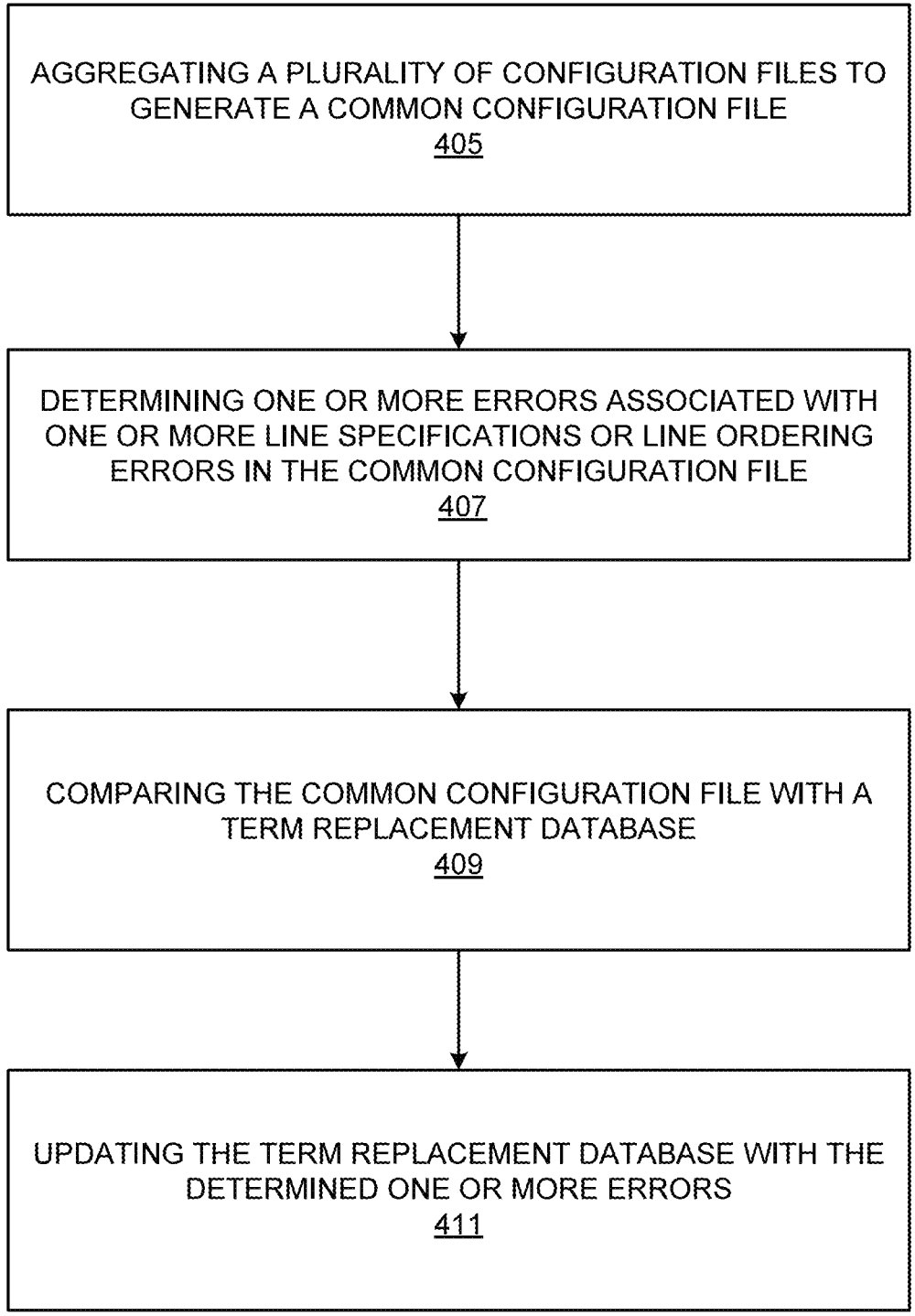
FIG. 4B illustrates an example implementation of a method in accordance with one embodiment.

FIG. 4B illustrates an example implementation of a method in accordance with one embodiment. At block 405, the machine readable storage medium 404 aggregates a plurality of configuration files to form a common configuration file. As described above, a common configuration file may be formed by consolidating line specifications such that each line specification in the common configuration file is representative of the line specification in multiple configuration files. The common configuration can also take the form of a non-file object such as a database. The format can vary for this common configuration file to accommodate all differences between the configuration files.

At block 407, the system determines whether there are one or more errors associated with the one or more line specifications ("line specification errors") and errors associated with the order of the line specifications ("line ordering errors"). Line specification errors can occur when the parameters or prerequisites for an individual line specification are incorrect. For example, if a particular command requires a prerequisite with a value between 1 and 7, and the line specification lists a value of 8, then a line specification error would occur. The system can determine that a value is not a part of the appropriate range, signaling a line specification error. The system may also determine the existence of a line specification error if the switch accepts the line specification but the grammar is more restrictive, or vice versa. As another example, if a command in the line specification does not match any valid commands, the system can also mark a line specification error. On the other hand, line ordering errors occur when multiple line specifications are not in the correct order. This may occur because one line specification provides a declaration for a subsequent command or there is a non-default prerequisite that must be met before the subsequent line specification. For example, if one line specification lists "vlan 3", wherein vlan 3 provides the declaration, with the command "interface vlan 3" prior to the declaration, a line ordering error may occur because the declaration needs to occur before the interface command. In other words, the correct order could be:

vlan 3
interface vlan 3
  no shutdown
  ip address 44.42.9.0/24
  ipv6 address de:fec8:d00:d00:caca:fee:ccc:2/96
interface lag 2
  vlan access 3
  no shutdown
  no routing The system can determine a line ordering error by reviewing a term replacement database, which is accessed when a common configuration file is loaded. This term replacement database may be located in a cloud network to be accessed by a wired or wireless connection. The same cloud network may also have a central configuration center wherein users can access various common configuration files. The term replacement database may include a model order for commands, default values or ranges, customized orders and/or values, a dictionary of valid commands, and other information on formatting common configuration files. The term replacement database may receive information specific to various models or version of firmware, or may receive information on new parameters or features associated with other users and/or purposes associated with the common configuration file. The term replacement database can list a particular command, the required declarations for the command, and the required positions in the order of line specifications for the command. If the ordering in the term replacement database does not match the common configuration file, the system can determine the existence of a line ordering error.

At block 409, the system compares the common configuration file with the term replacement database. The system will compare the common configuration file with the term replacement database to determine any differences between the common configuration file and the entries in the database, according to similar model or version of firmware as relevant. At block 411, the system updates the term replacement database with the differences, i.e. the determined errors. The system can update the term replacement dictionary with line ordering errors by altering the standardized ordering. The system can also create a separate standardized ordering to reflect the differences while maintaining a default standardized ordering. This can be associated with a particular model or firmware. For errors within line specifications, the system can add the error as a valid entry for one or more commands as applicable to the line specification. The system may distinguish between determined errors that reflect new parameters or features for a switch and determined errors that can be resolved by one or more resolutions, described further below. The system may refrain from updating the term replacement database if the determined error may be resolved, or may refrain from updating the database if the errors reflect a false negative already stored in the term replacement database for a different model. For example, if a particular line ordering is determined to be a false negative as evidenced by similar line orderings stored in the term replacement database, the system may simply note that the line ordering can apply to various models, and otherwise refrain from updating any standardized line ordering as it applies to a new feature or parameter.

Once the term replacement database is updated, the system may be able to determine whether a similar "error" occurs in later common configuration files. For example, a plurality of network switches may correspond to a different plurality of configuration files. These configuration files may be validated as a second common configuration file. When the plurality of network switches are validated, the system can note that the second common configuration file corresponds to the new feature or parameter added to the term replacement database from the first common configuration file. The plurality of network switches would then be validated faster as the system would refrain from determining any errors associated with the second common configuration file, which would otherwise delay the validation process. The system can continue to refrain from determining errors if subsequent network switches are validated with a similar common configuration file.

There are various resolutions that may be applied once a system determines a line specification error or an line ordering error. In one embodiment, the system can prompt a user to manually resolve the error. This may be done through a display prompt that gives the user a choice between manually resolving an error, applying an automatic resolution or determining that there is no error with the common configuration file. The user can edit the common configuration file to resolve any errors, and a subsequent validation would not have a prompt to resolve errors. The alleged errors can be marked in the line specifications so the user can locate the errors. For example, if a line specification error occurs, the line specification can be marked to show an error within the line specification. If a line ordering error occurs, the system can mark the line specification requiring a declaration. The system can also search through the line specifications to see if any line specification matches a needed declaration except in the wrong position. This line can also be marked so the user can locate the declaration and move the line specification accordingly. The system may also provide users the option to alert the system to errors even if the system does not determine any errors. The system may prompt the user to note these errors or may prompt a user to confirm there are no errors.

Once a user attempts to resolve an error, the system may determine whether the user's edits resolve the error. This may be determined by comparing the edits to the term replacement dictionary to find similarities between the edits, standardized ordering, and/or new features or parameters in the term replacement dictionary. For example, if an edit is made, and the edited line ordering now matches the term replacement dictionary, the system can determine that the user's edits resolved the error. As another example, if an edit appears to be similar to another new feature or parameter stored in the term replacement dictionary, then the system can determine that the user's edits resolved the error. If the new feature or parameter is similar to the edits but/for a difference between the models or firmware, the system may still determine that the user's edits resolved the error and store the new feature or parameter as also applicable to the current model or firmware.

After comparing the term replacement dictionary to the common configuration file, if the error is not resolved, the system may refrain from updating the term replacement database, or may revert the line specification to the previous iteration. The system can notify the user that the error is not resolved and display the above prompt to resolve the error. The system may send the common configuration file after a predetermined number of attempts to resolve the error. Once the common configuration file reaches the central configuration center, other users can resolve the determined errors.

In another embodiment, the system may apply automatic resolutions to resolve the errors. For example, if the system determines a line ordering error, the system can locate the line specification that matches the declaration as described above. The system can automatically move that line specification to the appropriate location. For a line specification error, the system may replace the inappropriate parameter with a default value or the closest legal value to the value specified in the error line. If the system is unable to automatically resolve the error, the system may prompt the user as described above. The system may also send the common configuration file to the central configuration center, so other users can resolve the error.

Figure 5:
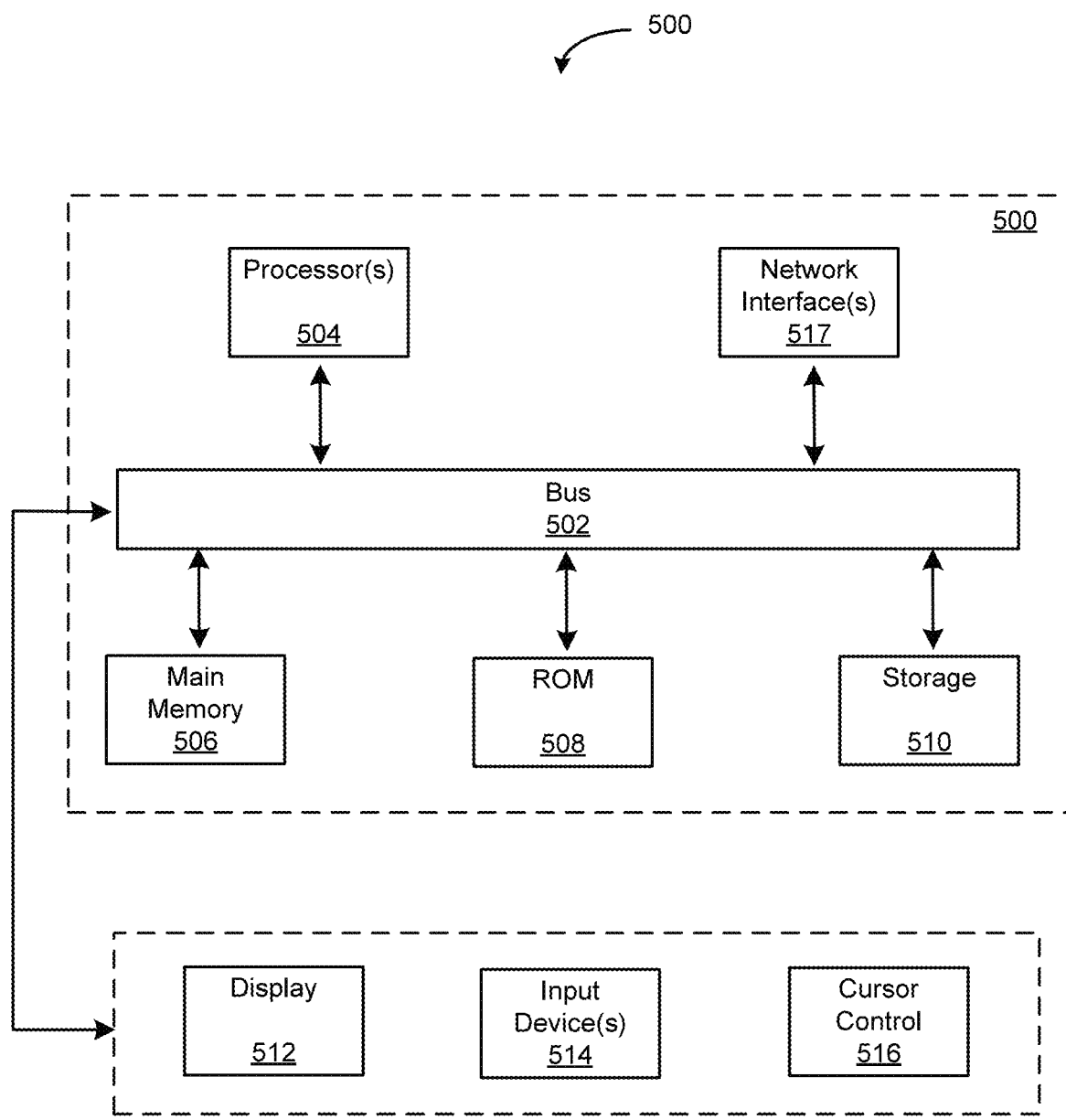
FIG. 5 depicts a block diagram of an example computer system in which various embodiments described herein may be implemented.

FIG. 5 depicts a block diagram of an example computer system 500 in which various embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 517 coupled to bus 502. Network interface 517 provides a two-way data communication coupling to one or more network links that are connected to one or more local networks. For example, communication interface 517 may be an integrated services digital network (ISDN) card, cable modem, satellite modem, or a modem to provide a data communication connection to a corresponding type of telephone line. As another example, network interface 517 may be a local area network (LAN) card to provide a data communication connection to a compatible LAN (or WAN component to communicate with a WAN). Wireless links may also be implemented. In any such implementation, network interface 517 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 517, which carry the digital data to and from computer system 500, are example forms of transmission media.

The computer system 500 can send messages and receive data, including program code, through the network(s), network link and communication interface 517. In the Internet example, a server might transmit a requested code for an application program through the Internet, the ISP, the local network and the communication interface 517.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for resolving configuration errors, comprising:
    aggregating, by a system comprising a hardware processor, a plurality of configuration files to generate a first common configuration file;
    determining, by the system, a line specification error or a line ordering error in the first common configuration file, wherein the line specification error is an error associated with a line specification;
    comparing, by the system, the first common configuration file with a term replacement database;
    updating, by the system, the term replacement database with the determined line specification error or line ordering error;
    updating, by the system, a second common configuration file corresponding to a plurality of switches;
    validating, by the system, the second common configuration file using the updated term replacement database; and
    causing installation of the second common configuration file on the plurality of switches as part of activating the plurality of switches.

2. The method of claim 1, wherein the plurality of configuration files is a first plurality of configuration files, and the method further comprising:
    identifying an additional line specification error or an additional line ordering error within a second plurality of configuration files, wherein the additional line specification error or the additional line ordering error is a line specification error or a line ordering error within the first plurality of configuration files; and
    reclassifying the additional line specification error or the additional line ordering error within the second plurality of configuration files.

3. The method of claim 2, further comprising updating a user interface to display the additional line specification error or the additional line ordering error within the second plurality of configuration files.

4. The method of claim 1, further comprising updating a user interface to display the line specification error or the line ordering error based on a type of error.

5. The method of claim 1, wherein the generating of the first common configuration file comprises replacing a line specification in a configuration file of the plurality of configuration files with a standardized line specification that represents a plurality of line specifications.

6. The method of claim 1, further comprising reordering of line specifications in the first common configuration file to resolve the line ordering error.

7. The method of claim 1, wherein the line specification error is based on a parameter, a command, or a prerequisite of the line specification being incorrect.

8. The method of claim 1, further comprising:
    receiving a user input to correct the line specification error or the line ordering error; and
    updating the term replacement database with the user input.

9. The method of claim 8, further comprising:
    determining that the user input does not resolve the line specification error or the line ordering error; and
    removing the user input from the term replacement database.

10. The method of claim 1, wherein the line ordering error is an error in an order of line specifications in the first common configuration file.

11. A system comprising:
    a hardware processor; and
    a non-transitory machine-readable storage medium storing instructions executable on the hardware processor to:
        aggregate a plurality of configuration files to generate a first common configuration file;
        determine a line specification error or a line ordering error in the first common configuration file, wherein the line specification error or the line ordering error is an error associated with a line specification;
        compare the first common configuration file with a term replacement database;
        update the term replacement database with the determined line specification error or line ordering error;
        update a second common configuration file corresponding to a plurality of switches;
        validate the second common configuration file using the updated term replacement database; and
        cause installation of the second common configuration file on the plurality of switches as part of activating the plurality of switches.

12. The system of claim 11, further comprising firmware, wherein a configuration file of the plurality of configuration files corresponds to the firmware.

13. The system of claim 11, wherein the line specification error is based on a parameter, a command, or a prerequisite of the line specification being incorrect.

14. The system of claim 11, wherein the line ordering error is an error in an order of line specifications.

15. A non-transitory computer-readable storage medium storing instructions when executed cause a system to:
    aggregate a plurality of configuration files to generate a first common configuration file;
    determine a line specification error or a line ordering error in the first common configuration file, wherein the line specification error or the line ordering error is associated with a line specification;
    compare the first common configuration file with a term replacement database;
    update the term replacement database with the determined line specification error or line ordering error;
    update a second common configuration file corresponding to a plurality of switches;
    validate the second common configuration file using the updated term replacement database; and
    cause installation of the second common configuration file on the plurality of switches as part of activating the plurality of switches.

16. The non-transitory computer-readable storage medium of claim 15, wherein the plurality of configuration files is a first plurality of configuration files, and wherein the instructions when executed cause the system to:
    identify an additional line specification error or an additional line ordering error within a second plurality of configuration files, wherein the additional line specification error or the additional line ordering error is a line specification error or a line ordering error within the first plurality of configuration files; and
    reclassify the additional line specification error or the additional line ordering error within the second plurality of configuration files.

17. The non-transitory computer-readable storage medium of claim 15, wherein the generating of the first common configuration file comprises replacing a line specification in a configuration file with a standardized line specification that represents a plurality of line specifications.

18. The non-transitory computer-readable storage medium of claim 15, wherein the instructions when executed cause the system to reorder line specifications to resolve the line ordering error.

19. The non-transitory computer-readable storage medium of claim 15, wherein the line specification error is based on a parameter, a command, or a prerequisite of the line specification being incorrect.

20. The non-transitory computer-readable storage medium of claim 15, wherein the line ordering error is an error in an order of line specifications.

* * * * *